July 31, 1951 O. J. BLATTNER 2,562,521
EMERGENCY WHEEL BRAKE
Filed May 31, 1949 2 Sheets-Sheet 2
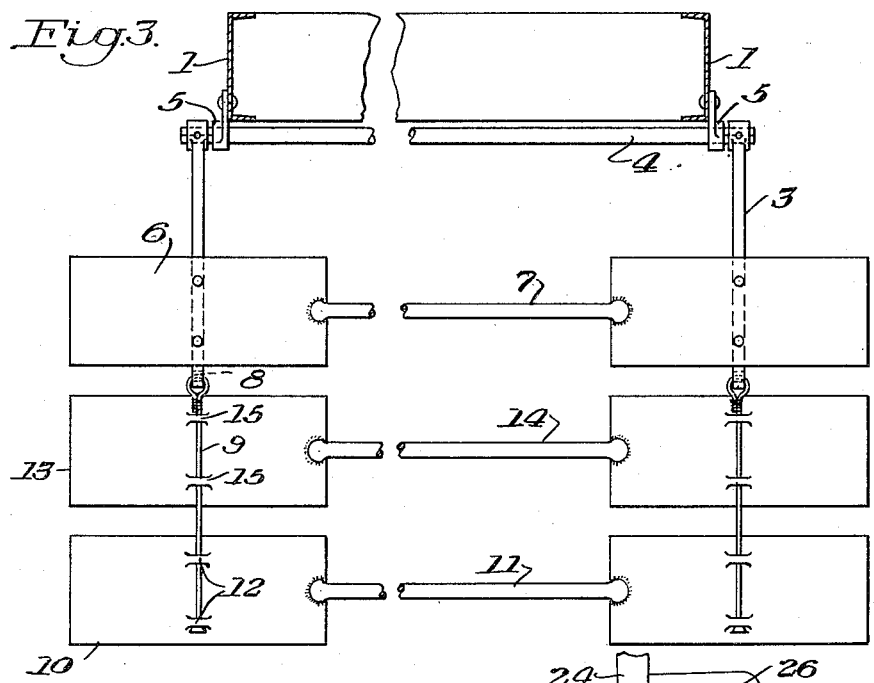
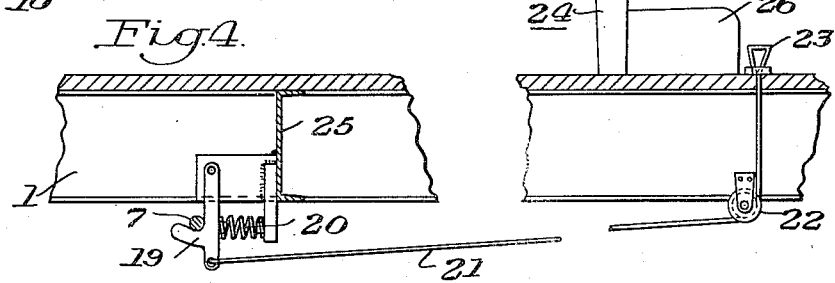
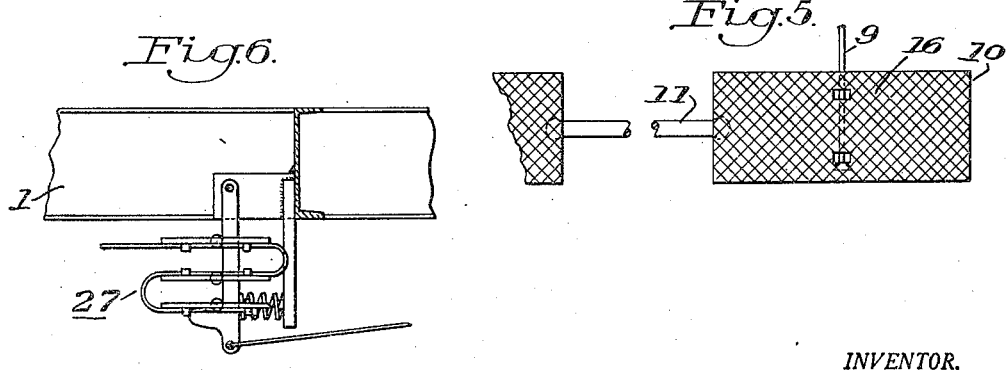
INVENTOR.
Oliver J. Blattner.
BY Jack R. Snyder
Attorney Patented July 31, 1951

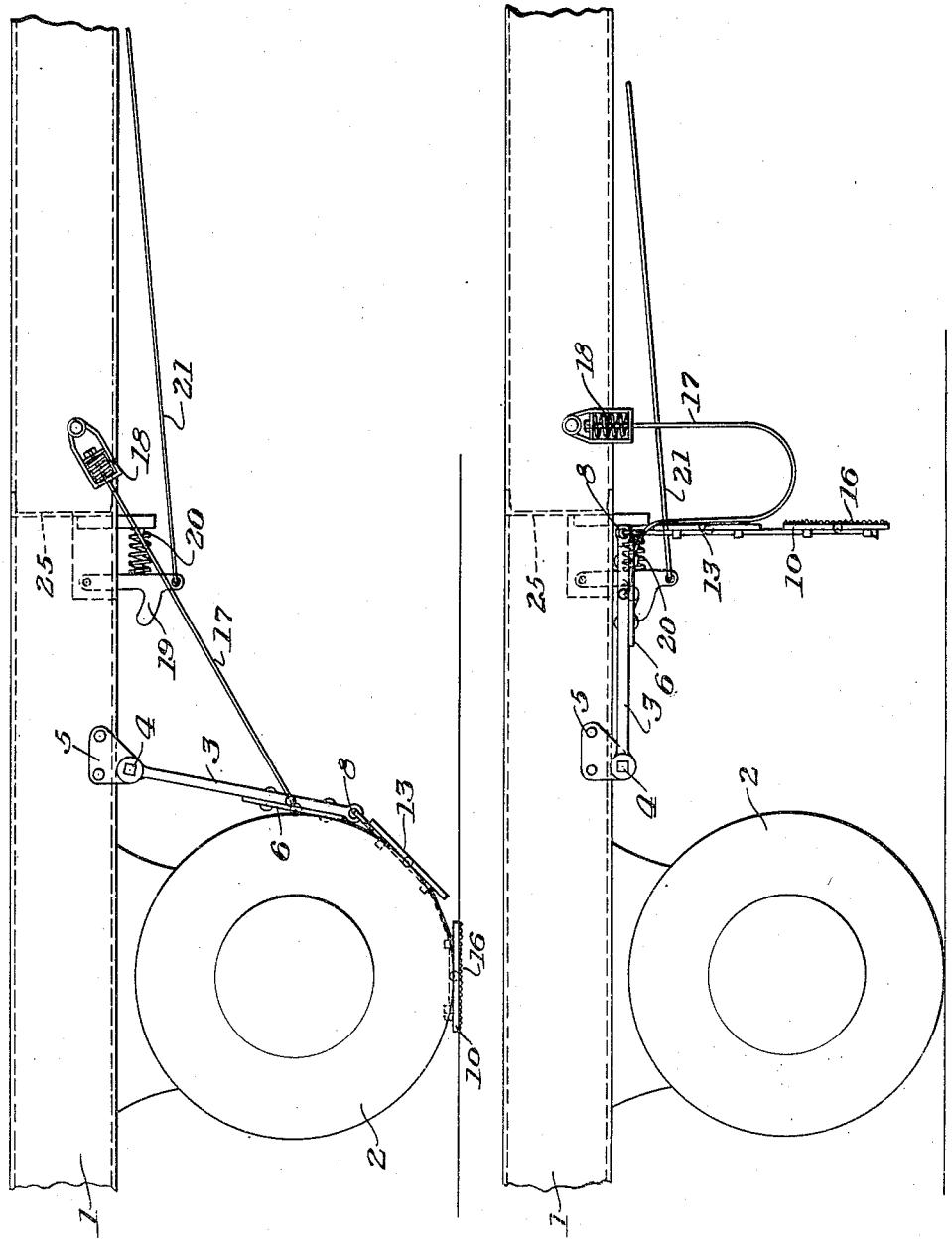

2,562,521

UNITED STATES PATENT OFFICE 2,562,521

EMERGENCY WHEEL BRAKE

Oliver J. Blattner, Pittsburgh, Pa.

Application May 31, 1949, Serial No. 96,200

1 Claim. (Cl. 188—4)

This invention relates to an improved emergency wheel brake, and while primarily designed and intended for use on freight-hauling motor vans and trailers, it will be obvious that the brake mechanism may be employed in connection with any other types of motor vehicles wherein it is found to be applicable.

The primary object of the invention is to provide an emergency wheel brake of the character described, which will function effectively to bring a motor vehicle to a stop within a very short distance in cases of emergency, as when the mechanical, hydraulic, or air brakes of the vehicle fail to operate for any reason, and under such conditions eliminate or at least minimize the hazards to life and property concomitant with the gravity travel of run-away vehicles on hills and the like.

Further objects and advantages of the invention are to provide a brake mechanism of the class stated, which may be quickly and conveniently operated, which may be readily installed in a vehicle already constructed as well as form a component part of a new vehicle structure, which will prevent skidding when employed, which is simple in its construction and arrangement, durable and efficient in its use, positive in its action, and comparatively economical in its manufacture, installation, and maintenance.

With the foregoing and other objects in view which will appear as the description proceeds, the invention resides in the novel construction, combination and arrangement of parts herein specifically described and illustrated in the accompanying drawing, but it is to be understood that the latter is merely illustrative of an embodiment of the invention, and that the actual needs of practice and manufacture may require certain mechanical variations from the embodiment shown. It is, therefore, not intended to limit the invention to the disclosure thereof herein illustrated, but rather to define such limitations to the scope of the claim hereunto appended.

In the drawing wherein like numerals of reference designate corresponding parts throughout the several views:

Figure 1 is a fragmentary side elevational view of a motor vehicle equipped with an emergency wheel brake in the operative position, and being constructed in accordance with the invention.

Figure 2 is a similar view with the brake mechanism disposed in the released inoperative position.

Figure 3 is a plan view of the device and illustrating the connection of the latter with the motor vehicle.

Figure 4 is a side elevational view of the latch and release elements embodied in the invention.

Figure 5 is a plan view of the road engaging surface of one of the skid plates.

Figure 6 is a side elevational view of a modified arrangement for securing the device in a more fully collapsed inoperative position.

Referring in detail to the drawing the numeral 1 designates the motor vehicle frame of the conventional trailer type construction, to which the rear wheels 2 are attached in the usual manner well known in the art to which the invention appertains.

The improved emergency wheel brake, as illustrated, is designed for use in connection with dual type wheels, but it will be apparent that the device may be constructed to adapt same for either single or dual types of wheels without departing from the principle of the invention.

The invention comprises a pair of suspension arms 3, which have their upper ends fixed to respective ends of a supporting shaft 4. The shaft is disposed in transverse, horizontal position, forwardly of the wheels 2 and below the frame 1, and is suitably journaled for rotation in a pair of bearing brackets 5 which are fixed to the frame. The suspension arms extend in parallel relation to each other and swing with the movement of the shaft 4.

A pair of fixed brake plates 6 are rigidly secured against the rear side of the free end portions of the respective suspension arms 3. The pair of fixed brake plates are disposed in horizontal alignment and are rigidly joined together by an interposed connecting bar 7, whereby said fixed brake plates must shift with the movement of the suspension arms.

The free end of each of the suspension arms 3 is formed with an eye 8, in each of which latter is secured one end of a flexible drag cable 9. The drag cable may be in the form of a chain or wire rope, preferably the latter, as shown.

A pair of shiftable skid plates 10 are permanently secured to respective free end portions of the drag cables 9, and are rigidly joined together in horizontal alignment by a connecting bar 11. Each of the drag cables extends along the transverse center of the rear surface of respective skid plates, and passes through a pair of connecting loops 12, formed on each of said skid plates, and is permanently secured to the latter and in said pair of loops by means of welding, or in any other suitable manner.

A pair of shiftable brake plates 13 are permanently secured to respective drag cables 9 and are rigidly joined together in horizontal alignment by a connecting bar 14. The shiftable brake plates 13 are positioned between and in spaced relation to the pair of fixed brake plates 6 and the pair of skid plates 10. Each of the drag cables 9 extends across the transverse center of the rear surface of respective brake plates 13, and passes through a pair of connecting loops 15, formed on each of said plates 13, and is permanently secured to the latter and to said loops 15 preferably by welding.

The plates 6, 10 and 13 are constructed of any suitable metal plate material, and all are oblong, rectangularly-shaped and of uniform size. The longitudinal disposition of each of said plates is transversely of the vehicle structure, and each associated pair of plates is disposed in horizontal parallel relation to the other pairs of plates.

The emergency brake mechanism is held and secured in the released, inoperative position, as shown in Figure 2, by means of a securing latch 19, which latter has its upper end pivotally connected at the center of a cross member 25 of the vehicle frame 1. The latch is engageable on the center of the connecting bar 7 of the fixed brake plates 6, and such engagement is normally maintained by the action of a spring 20 which is joined with said latch and with the frame 1.

When the brake mechanism is secured in the inoperative position by the latch 19, the suspension arms 3, together with the fixed brake plates 6 carried by said arms, are positioned closely against the underside of the vehicle frame, and the skid plates 10 and the shiftable brake plates 13, carried by the drag cables 9, depend vertically from the free ends of the suspension arms, as illustrated in Figure 2. The wire rope drag cables 9, being fairly stiff though flexible, will stabilize such suspension of the plates 10 and 13, and thereby prevent undue noisy dangling movement of the latter during the travel of a vehicle equipped with the brake mechanism.

A pull rope 21, having one end thereof attached to the securing latch 19, is provided for releasing the brake mechanism from its secured inoperative position. The pull rope extends forwardly and passes over suitably positioned sheaves 22, carried by the frame 1, and has its other end connected to a handhold 23, which is located within the vehicle cab 24 within convenient reach from the driver's seat 26.

To operate the brake mechanism in an emergency, the latch 19 is released from the connecting bar 7 by a yank on the pull rope 21. The mechanism will immediately drop by gravity on its pivotal connection with the supporting shaft 4, and the momentary forward travel of the vehicle causes the rear wheels 2 to ride up on the skid plates 10 and against the plates 6 and 13, whereby the rear wheels are held against further rotation, and the skid plates drag on the road surface to stop the vehicle within a very short distance.

The road engaging surface of the skid plates 10 are suitably roughened, as indicated at 16, to augment the gripping action of said plates 10 when functioning to bring a motor vehicle to a stop by the use of the mechanism in the manner stated.

It will be apparent that the initial stress imposed on the brake mechanism during the operation of the latter is very great, and to lessen and absorb such stress a pair of bracing cables 17 are employed. The bracing cables are connected with respective suspension arms 3 and with spring cushioned shock absorbers 18, which latter are pivotally connected with the vehicle frame 1.

By rigidly joining each associated aligned pair of plates 6, 10, 13, together by respective connecting bars 7, 11, and 14, said plates will maintain their proper alignment and position with respect to each other, and thereby assure the uniform and effective function of said plates when employed for an emergency braking operation.

It will here be noted that, if required, the brake mechanism may be attached to the vehicle frame rearwardly of the rear wheels and employed for stopping a vehicle in an emergency from travelling in the backward direction.

In the embodiment of the invention, shown in Figure 6, all of the brake plates are carried by a pair of drag cables, and when the device is in the inoperative position, the said plates are folded upon each other, as indicated at 27, and so secured by the securing latch. Such folded arrangement of the device might, however be rendered inoperative when subjected to untoward weather conditions.

The present invention provides a most efficient device of its kind, which may be economically constructed and successfully employed for the purpose and in the manner herein set forth.

What I claim is:

An emergency wheel brake for a motor vehicle, comprising the combination of a horizontal transversely extending shaft revolubly supported by the vehicle frame, a pair of suspension arms fixed to respective ends of said shaft, a pair of flexible members connected with respective free ends of said arms, a pair of fixed brake plates rigidly secured to respective free end portions of said arms, a pair of skid plates connected with respective free end portions of said members, a pair of brakes plates connected with said pair of members and disposed intermediate of said pair of fixed plates and said pair of skid plates, each of said pair of plates horizontally aligned with respect to each other and rigidly joined together by a fixed interposed connecting bar, a pair of spring cushioned flexible bracing elements connected with the frame of the vehicle and with respective arms adjacent to the free ends of said arms, and a spring controlled latch mechanism pivotally connected to the frame of the vehicle and normally engaging one of said connecting bars for holding said plates in the elevated inoperative positions, said mechanism manually operable to release said mechanism from said engaged connecting bar to allow the gravity drop of said plates to the operative braking positions.

OLIVER J. BLATTNER.

REFERENCES CITED

The following references are of record in the file of this patent:

UNITED STATES PATENTS

| Number | Name | Date |
| --- | --- | --- |
| 1,201,684 | Brockhaus | Oct. 17, 1916 |
| 1,313,103 | Mahoney | Aug. 12, 1919 |
| 1,422,646 | Winters | July 11, 1922 |

FOREIGN PATENTS

| Number | Country | Date |
| --- | --- | --- |
| 96,567 | Sweden | Aug. 15, 1939 |
| 750,983 | France | Aug. 24, 1933 |